United States Patent [19]

Walde

[11] Patent Number: 5,047,459

[45] Date of Patent: Sep. 10, 1991

[54] FLAMEPROOF COMPOSITIONS OF POLYCONDENSATION PRODUCTS

[75] Inventor: Günther Walde, Flein, Fed. Rep. of Germany

[73] Assignee: L. Brüggemann Komm.-GES., Heilbronn, Fed. Rep. of Germany

[21] Appl. No.: 292,999

[22] Filed: Jan. 3, 1989

[51] Int. Cl.$^5$ ............................................ C08K 5/3492
[52] U.S. Cl. .................................................... 524/100
[58] Field of Search .................................. 524/98, 100

[56] References Cited

U.S. PATENT DOCUMENTS 4,543,378  9/1985  Suhara et al. ...................... 524/100
4,689,361  8/1987  Mumcu et al. ..................... 524/100

Primary Examiner—Kriellion S. Morgan
Attorney, Agent, or Firm—Birch, Stewart, Kolasch & Birch

[57] ABSTRACT

A self-extinguishing thermoplastic composition containing at least one polycondensation product, and a flame retardant which comprises a mixture of melamine with at least one adduct of an isocyanate and a lactam wherein the proportion of adduct, based on the mixture of melamine and adduct, amounts to 5–25% by weight.

10 Claims, No Drawings

FLAMEPROOF COMPOSITIONS OF POLYCONDENSATION PRODUCTS

BACKGROUND OF THE INVENTION

1. Field of the Invention

The present invention relates to a self-extinguishing thermoplastic composition comprising a thermoplastic polycondensation product and to a process for the preparation thereof.

2. Discussion of Related Art

Formulations of halogen compounds, and in most cases these compounds being in combination with antimony trioxide, are recommended as flame retardants for the manufacture of flameproof polycondensation products. Typical representatives of such halogen compounds are perbrominated aromatics, such as decabromodiphenyl oxide, polymers thereof, such as polytribromophenylene oxide, as well as, for example, perchloropentacyclodecane. The use of such products as flame retardants has been described in U.S. Pat. No. 3,418,267, German Published Applications DE-AS 1,694,494 and DE-AS 1,931,387, German Laid-Open Application DE-OS 2,544,219, and German Patent DE 2,937,379 C 2.

In spite of advances in the art afforded by the utilization of these halogen compounds as flame retardants, their use is accompanied by considerable drawbacks. Such drawbacks have been dealt with in detail in British Patent 0044 419 B1 and in German Patent 3,208,486 C 2. An especially grave disadvantage resides in that when using perbrominated aromatics, such as decabromodiphenyl oxide or decabromodiphenyl, toxic compounds are formed during their combustion, such as dioxins and furans, so that in the case of a fire, grave injuries can occur.

In addition to the halogen compounds, it is also known to use elemental red phosphorus for rendering thermoplastics, particularly polyamide, flameproof. This mode of operation is set forth in German Published Application DE-AS 1,173,641 and U.S. Pat. No. 3,951,908.

Here again, a number of drawbacks must be tolerated, such as the effect on the color and electrical values. British Patent 0044 419 B1 provides information on these aspects.

Finally, a number of nitrogen-containing compounds are utilized as flame retardants in thermoplastics. These involve melamine, as well as melamine derivatives. Such have been suggested, inter alia, in U.S. Pat. No. 4,263,203, German Patent DE 2,937,379 C 2, British Patent 0044 419 B1, and German Published Application DE-AS 1,694,254. As disclosed in the specifications of the aforementioned patents, nitrogen-containing compounds exhibit a number of advantages over the previously mentioned products.

However, in most cases, processing stability is inadequate, especially when the higher-melting polyamide and polyester types, such as polyamide 6,6 and polybutylene terephthalate, are rendered flameproof. In particular, nitrogen-containing compounds are unsuitable for mineral- and glass-fiber-reinforced polyamide and polyester synthetic resins, to be utilized in the industrial field. Besides lacking temperature stability, such nitrogen-containing flame retardants have the drawback in that they do not melt with the polymer melt but rather are present therein only as extremely fine particles. In the usual case, a dispersant must be additionally used in order to obtain a maximally fine, uniform distribution. This situation results in a decrease in the mechanical values during the use of these flame retardants, especially in the impact resistance property.

The advantage displayed by the use of melamine cyanurate, as compared with melamine in accordance with the patent specifications, resides in a reduction in the so-called plate-out due to the sublimation of melamine at processing temperatures. However, the use of melamine cyanurate does lead to increased dripping. This makes it even difficult to stay within the customary flame retardance test UL 94-V0 (in accordance with testing standard by Underwriters Laboratories Inc., dated Feb. 1, 1974).

Melamine display greater temperature stability than melamine cyanurate. However, practical application thereof is hindered, in addition to the aforementioned tendency toward sublimation leading to plate-out, it is also hindered by the lower hydrolysis stability of melamine. When boiling melamine-treated polyamide test rods, the flame retarding effect which was initially present, is diminished.

German Patent 3,208,486 C 2 describes the use of a reaction product of cyanuric acid with 2 to 2.35 moles of melamine and, respectively, whereby melamine derivatives having the above-described deficiencies are to be avoided. However, the admixture rates in order to attain self-extinguishing properties in accordance with UL 94 are relatively high. Furthermore, the data relate especially to polyamide 6,6 rather than to glass-fiber-reinforced thermoplastics, of which the flameproofing thereof has gained increasing importance.

OBJECT AND SUMMARY OF THE INVENTION

The present invention has as its object to develop highly flameproof, thermoplastically processable compositions of polycondensation products, as well as suitable methods for their production, which exhibit advantages over flameproof polycondensation products manufactured heretofore.

It is surprising and could not be foreseen that, by adding an adduct of an isocyanate and a lactam, e.g. caprolactam, in conjunction with melamine, flammability is reduced. It was especially surprising that such adducts in a mixture with melamine reduce flammability even if an excess of lactam is present therein. As is known, monomeric lactams raise the flammability of polyamides considerably.

It was furthermore surprising that these novel flame retardants, added in powder form, were distributed in the molding compositions in a very fine and uniform fashion, even without the addition of dispersants, as compared with the case of the nitrogen compounds of melamine which do not melt in the polyamide matrix (as illustrated in Tables 1-3 below). Especially noticeably in the case in which melamine cyanurate is the flame retarding agent, it is present in a highly nonuniform distribution pattern.

Therefore, the present invention relates to self-extinguishing, thermoplastic compositions of at least one thermopolastic polycondensation product, characterized in that they contain as the flame retardant, a mixture of melamine with at least one adduct of an isocyanate and a lactam, wherein the proportion of the adduct, based on the mixture of the melamine and adduct, amounts to 5-25% by weight.

Thermoplastic polycondensation products according to the present invention are understood to define reaction products having been derived from two or more chemical compounds wherein these compounds in each case exhibit at least two reacting groups which can react with the reactive groups of their co-reactants and yield, after reaction has occurred, thermoplastically processable polymers. Such polycondensation products can also be formed by causing a molecule containing two different reactive groups to react with other molecules containing reactive groups corresponding therewith. Of course, in order to produce the products to be rendered flameproof according to the present invention, it is also possible for the compounds containing two different groups, capable of reacting with each other, to react and thereby resulting in the formation of condensation products.

On the other hand, thermoplastic polycondensation products which can be treated to be flameproof in accordance with the present invention can also be formed by ring-opening polymerization of rings which contain hetero atoms.

Thermoplastic polycondensation products that are suitable according to the present invention can also be formed by a combination of these reaction possibilities. It is also feasible to utilize mixtures of different polycondensation products and mixtures thereof with other thermoplastic synthetic resins. Preferred thermoplastic condensation products are polyamides and polyesters, as well as mixtures thereof.

Suitable polyamides are all of the thermoplastically processable polyamides, in the pure form or in a mixture with auxiliary additives, such as fillers, stabilizers, plasticizers, etc. Polyamides useable in accordance with the present invention are: polycondensation products of diamines and dicarboxylic acids, polycondensation products of ω-aminocarboxylic acids, polylactams, as well as copolyamides derived from these components. In addition to homopolymeric polyamides and mixed polyamides, it is also possible to flameproof, in accordance with the present invention, polyamide alloys, as well as mixtures thereof, or the so-called "blends" thereof, with other polymers. In this context, these alloys or blends can likewise be one or several polyamides, or a polyester, such as polyethylene terephthalate or polybutylene terephthalate, as well as other thermoplastics. Low-melting polyamides, such as polyaminoundecanoic acid as well as polylaurolactam and alloys with these polyamides are likewise suited for the flameproofing treatment according to the present invention. The essential feature in this case, is that the processing of such thermoplastics be performed at temperatures of below 300° C., if at all possible.

Suitable isocyanates are aliphatic, cycloaliphatic, aromatic and alkylaromatic mono-, di- and polyisocyanates which, in turn, can contain hetero atoms, such as oxygen or nitrogen. Examples of these isocyanates are: tetramethylene-, hexamethylene-, octamethylenediisocyanate, 4,4'-methylenebis(cyclohexyldiisocyanate), 2,4-toluylenediisocyanate, 2,6-toluylenediisocyanate, ω,ω-diisocyanatodimethylbenzene, 4,4'-methylenebis(phenylisocyanate), di- and polyisocyanates by reaction of diols and polyols with diisocyanates, and the like. The isocyanates to be used in accordance with the present invention are not limited to the above exemplary listing.

The thermoplastic polycondensation products can contain the auxiliary agents which are customarily used in processing, such as lubricants, fillers and reinforcing agents, antioxidants, etc., wherein these additives can also be used in mixtures, depending on the required utilization. Since such additives usually affect the flame retarding characteristic of the polyamide molding compositions, an increased proportion of flame retardant to be utilized may become necessary.

The proportion of isocyanate-lactam adduct in the flame retardant can fluctuate within the above-indicated limits. In case of nonreinforced polyamide, this proportion is in the higher range of 10–25% in the mixture with melamine; whereas in case of a reinforced material requiring a higher total dosage of flame retardant, this proportion is comparatively lower.

It is preferred to utilize melamine in maximally finely divided form.

The thermoplastic compositions of the present invention preferably contain an adduct of a diisocyanate and a lactam. A preferred lactam is ε-caprolactam.

In an especially preferred thermoplastic composition according to the present invention, the adduct consists of ε-caprolactam and hexamethylene diisocyanate in a molar ratio of 0.2 to 0.5 mole of hexamethylene diisocyanate to 1 mole of ε-caprolactam.

The amount of the mixture of melamine with the aforementioned adduct, utilized as the flame retardant, can vary within a wide range. Preferably, the quantity of flame retardant is 2–30% by weight, based on the entire composition.

The flame retardant according to the present invention can also be utilized with other flame retardants, e.g., melamine cyanurate, but in this case the proportion of the melamine cyanurate in the mixture should not exceed 25%.

Incorporation of the flame retarding mixture can be performed in a conventional manner by means of using the devices commonly used in a compounding operation, for example by introducing the finished powder mixture of both components in separate connecting pipes into a twin screw extruder and granulating into a homogeneous composition. It is also possible to premix the melamine with the starting granules and to introduce the lactam-isocyanate component in powder form or as a liquid via an additional, separate connecting pipe into the extruder. In this procedure, it is also possible to add the isocyanate and lactam separately instead of as an already produced lactam-isocyanate adduct.

Finally, a masterbatch can be produced in a first step, for example based on polyamide 6, containing a high content of flame retarding mixture, e.g. 50%. With such a masterbatch, reinforced polyamides and comparable polymers can be preferably treated, whereby advantages result from the distribution of the flame retardant in the polyamide matrix and therefore resulting in a substantial improvement in the impact resistance of the thus-treated composition. Besides the usual stearates (Ca, Mg, Zn), it is also possible to utilize with advantage amides, such as bis-stearylamide and toluenesulfonamides (for example the mixture of ortho- and para-), as processing aids and, respectively, lubricants for the production of correspondingly highly filled masterbatches.

A special advantage resides in that the flame retardant present in the polymerization composition surprisingly cannot be washed out to any measurable extent by boiling water. The corresponding test results are set forth in Table 5.

With the aid of the flame retardant of the present invention, thermoplastic compositions can be produced which exhibit flameproofing characteristics corresponding to the norms. The flame retardant treatment in accordance with the present invention is superior in many respects to the flame retarding finishings known heretofore. The compositions exhibit considerably diminished plate-out. They can be manufactured in light-colored, almost colorless grades with good electrical values. During processing or in case of combustion, pollution effects, as known from the flame retardants based on phosphorus and halogen, are not to be expected.

The various methods for incorporation of the flame retardants will be described in the following examples.

DETAILED DESCRIPTION OF THE INVENTION

The present invention is described in detail in the Examples and Tables below. The following abbreviations are employed:

FR agent = flame retardant agent
M = melamine
MC = melamine cyanurate
VN = reaction product of 3 moles of ε-caprolactam and 1 mole of hexamethylene diisocyanate
VH = processing aid The testing and measured values cited in these examples are determined as follows:

1. Flammability

Test rods with the dimensions of 126 x 12.6 mm having a thickness of 1.6 and, respectively, 3.2 mm are stored prior to testing at 23° C. and 50% relative atmospheric humidity for 24 hours and subsequently tested in accordance with Underwriters Laboratories Inc. (UL) Subject 94 (vertical burning test for classifying materials).

Decisive criteria for classification according to V2 and V0, respectively, are the burning period and the dripping characteristic, especially to the effect whether the wad ignites during dripping (V2) or whether it does not ignite (V0).

The Tables indicate, in addition to this UL-94 classification, that the entire burning period for the 2 x 5 = 10 rods in seconds, and the number of drops (drop number) resulting in total in the testing of 10 rods, in order to clarify the differences in the burning characteristic.

2. Processing Criteria

The Tables contain data which are to yield information on the dispersion/distribution of the flame retardant in the polymer matrix. For this purpose, the test specimen is viewed in translucent light, and the degree of distribution of the flame retardant which, in the normal case is not melted, is evaluated.

The column "Unmolding" contains data on the unmoldability during injection molding of the compositions treated with the flame retardants. Finally, the Tables also contain information regarding the residues in the injection mold which are to yield explanations regarding the sublimation of the flame retardants during processing.

3. Mechanical Properties

The tensile strength and tensile impact resistance are measured analogously to DIN 53455 and, respectively, DIN 53448 on a flat rod, 126 x 12.6 x 1.6 mm, without and, respectively, with cut-out notch 6 mm after a storage period of 24 hours at 23° C. and 50% relative atmospheric humidity.

The quantities indicated in the examples are set forth either in moles or in weights. Insofar as parts are mentioned, these are parts by weight.

EXAMPLE 1 (COMPARATIVE EXAMPLE)

2 kg of polyamide 6,6 having a relative viscosity $\eta_{rel}=2.7$ is injection molded, after pre-drying in a vacuum dryer at 70° C., for 12 hours on a screw injection molding machine model Arburg Allrounder 221-75-350 into test specimens having the dimension of 126 x 12.6 x 1.6 mm. The resultant test specimens are tested in accordance with the procedure indicated under (1) and (2), and the results are set out in Table 1. As can be seen from Table 1, the composition exhibits an unfavorable burning behavior as compared with the products according to the present invention.

EXAMPLE 2

In a reactor, ε-caprolactam is melted under nitrogen and such an amount of hexamethylene diisocyanate (HDI) is added under vacuum in metered quantities that 1 mole of HDI is made to react per 3 moles of ε-caprolactam. The thus-obtained adduct is discharged, after cooling, as a melt into moistureproof containers and later on ground into a powder under addition of nitrogen.

This powder, denoted as VN hereinbelow, is mixed thoroughly with finely divided melamine having an average threshold particle size of 60 μm, 1 part of VN being provided per 9 parts of melamine.

Eight parts of this pulverulent flame retardant mixture is then thoroughly mixed as a so-called dry blend with 92 parts of polyamide 6,6 granules, as described in Example 1, and injection molded to test specimens analogously to Example 1.

Table 1 shows that the composition according to the present invention exhibits a very good dispersion of the flame retardant and is to be classified as self-extinguishing according to UL 94 V0.

EXAMPLE 3

The procedure of Example 2 is followed. The proportion of flame retardant component VN in the mixture with melamine is increased from 10 parts to 15 parts.

As indicated by Table 1, the resultant compositions are to be classified as self-extinguishing according to UL 94 V0; they exhibit a very good dispersion of the flame retardant.

EXAMPLE 4

The process of Example 2 is carried out with the difference that finely divided melamine having an average threshold particle size of 60 μm is utilized as the flame retardant. Table 1 shows that the resultant test specimens are likewise self-extinguishing in accordance with UL 94 V0 but exhibit poor dispersion of the flame retardant and leave residues in the mold.

EXAMPLE 5

The mold of operation likewise corresponds to Example 2. The flame retardant incorporated is finely divided melamine cyanurate having an average threshold particle size of 90 μm. The thus-produced test specimens show a less favorable burning characteristic corresponding to the classification UL 94 V2, and a markedly poorer dispersion of the flame retardant.

EXAMPLE 6 (COMPARATIVE EXAMPLE)

2 kg of polyamide 6 with a relative viscosity $\eta_{rel}=2.6$ is predried in the same manner as in Example 1 and injection molded to test specimens having the dimension of 126 x 12.6 x 1.6 mm.

The results of the test, performed in the same way as in Examples 1-5, are listed in Table 2. The resultant composition shows an adverse burning characteristic as compared with the products according to the present invention.

EXAMPLE 7

1.84 kg of polyamide 6 as in Example 6 is thoroughly mixed with 0.16 kg of pulverulent flame retardant mixture corresponding to Example 2 and injection molded into test specimens as in Example 6.

The results set forth in Table 2 demonstrate that the composition obtained according to the present invention is to be classified as self-extinguishing according to UL 94 V0; it has a reduced dripping tendency during the flammability test, and shows a good dispersion of the flame retardant.

EXAMPLE 8 (COMPARATIVE EXAMPLE)

The procedure of Example 7 is followed except that finely divided melamine cyanurate having an average threshold particle size of 90 μm is used as the flame retardant. The resultant composition shows a poorer dispersion of the flame retardant, as compared with the composition according to this invention, an increased dripping tendency during burning, and can be classified only according to UL 94 V2.

EXAMPLE 9 (COMPARATIVE EXAMPLE)

The procedure of Example 7 is performed with the difference that finely divided melamine having an average threshold particle size of 60 μm is incorporated as the flame retardant. The thus-obtained composition exhibits the same disadvantages with respect to the composition of the present invention in a similar way as in Example 8.

EXAMPLE 10 (COMPARATIVE EXAMPLE)

The process is conducted as described in Example 7. The flame retardant utilized is a powdery mixture of the components melamine, melamine cyanurate, zinc borate, and calcium stearate in the ratio of 6:1.2:0.64:0.16. Eight parts by weight of this flame retardant mixture is mixed thoroughly with 92 parts by weight of polyamide 6 corresponding to Example 6 and injection molded into test specimens as in Example 7. A reduced drop number is determined in the flammability test. The classification is UL V0. Dispersion is markedly poorer as compared with the product according to the present invention.

EXAMPLE 11 (COMPARATIVE EXAMPLE)

2 kg of polyamide 6,6, reinforced with 30 parts by weight of glass fiber, is injection molded into test specimens having the dimension 126 x 12.6 x 3.2 mm.

As shown in Table 3, the thus-obtained molded products burn through entirely in the UL 94 test.

EXAMPLES 12 AND 13

3 kg of polyamide 6,6, reinforced with 30 parts by weight of glass fiber, is thoroughly mixed with 1 kg of flame retardant mixture according to Example 2 and injection molded into test specimens as in Example 11. The resultant composition corresponds in both examples to classification UL V0. The composition contains 22.5 parts by weight of glass fiber and 25 parts by weight of flame retardant mixture.

In order to improve the dispersion of the flame retardant and to test its thermal stability, test specimens from Example 12 are comminuted and again injection molded. As can be seen from Table 3, the good flameproofing properties remain preserved, and the dispersion of the flame retardant is improved in Example 13.

EXAMPLE 14 (COMPARATIVE EXAMPLE)

2.325 kg of polyamide 6,6, reinforced with 30 parts by weight of glass fiber, is thoroughly mixed with 0.675 kg of finely divided melamine having an average threshold particle size of 60 μm, and injection molded into test specimens as in Example 11. The test specimens contain 23.25 parts by weight of glass fiber. Table 3 shows that the resultant composition exhibits a substantially less favorable burning characteristic than the composition of the present invention according to Examples 12 and 13. Only classification UL V2 is reached. Furthermore, marked residues are observed in the mold, and surface flaws are found due to sublimation of the flame retardant.

EXAMPLE 15 (COMPARATIVE EXAMPLE)

3 kg of polyamide 6,6, reinforced with 30 parts by weight of glass fiber, is thoroughly mixed with 1 kg of pulverulent flame retardant consisting of 90 parts by weight of finely divided melamine cyanurate having an average threshold particle size of 90 μm and 10 parts by weight of a reaction product (adduct) according to Example 2, and injection molded into test specimens as in Example 11. The test specimens contain 22.5 parts by weight of glass fibers.

As in Example 14, the resultant compositions cannot be classified according to UL V0 and exhibit surface flaws on account of the sublimation of melamine cyanurate. In contrast to the products according to this invention, pronounced residues in the form of coatings are found in the mold.

EXAMPLE 16

2 kg of polyamide 6,6, reinforced with 50 parts by weight of glass fiber, are thoroughly mixed with 2 kg of flame retardant batch and injection molded into test specimens according to Example 11.

The flame retardant batch is present in granular form, containing 50 parts by weight of polyamide 6 with a relative viscosity $\eta_{rel}=2.6$ and 50% by weight of flame retardant mixture according to Example 2.

The resultant composition contains 25% by weight of glass fiber and corresponds to the classification UL V0. The test specimens show a good dispersion of the flame retardant; only very minor residues can be found in the mold. Example 15 demonstrates that the combination of melamine cyanurate with the adduct of this invention leads to increased flammability and does not make a V0 classification possible. In contrast thereto, this can be done with the combination of melamine with the adduct of the present invention from Example 2, at the same quantitative ratios, as demonstrated by Examples 12, 13, and 16.

EXAMPLE 17

3.2 kg of polyamide 6, reinforced with 50 parts by weight of glass fiber, is thoroughly mixed with 0.8 kg of flame retardant mixture according to Example 2 and injection molded as described in Example 11. The molded articles contain 40 parts by weight of glass fiber and 20 parts by weight of flame retardant. Classification corresponds to UL V0 at 3.2 mm.

EXAMPLE 18

2.64 kg of polyamide 6, reinforced with 30 parts by weight of finely divided kaolin having an average threshold particle size of 100 μm, is thoroughly mixed with 0.36 kg of flame retardant mixture according to Example 2 and injection molded as described in Example 11.

The results are light-brown test specimens having a thickness of 3.2 mm with a content of 26.4 parts by weight of kaolin and 12 parts by weight of flame retardant mixture. The dispersing ability of the flame retardant is very good. Classification corresponds to UL V0.

EXAMPLE 19

3.3 kg of polyamide 6 with a viscosity of $\eta_{rel}=2.6$ is thoroughly mixed with 0.7 kg of polyamide 12 (standard brand) and 1 kg of flame retardant batch as utilized in Example 16 and injection molded to test specimens as in Example 11. Test rods result which, besides having a light color, show good flexibility and surface and, with a thickness of 3.2 mm, correspond to the classification UL V0.

EXAMPLE 20

3.68 kg of polyamide 6 as in Example 19 is thoroughly mixed with 0.32 kg of flame retardant mixture of 90 parts by weight of finely divided melamine having a threshold particle size of 60 μm and 10 parts by weight of an adduct of 3 moles of ε-caprolactam and 1 mole of 4,4'-methylenebis(phenylisocyanate) and injection molded as described in Example 11. The resultant test specimens having a thickness of 3.2 mm correspond to classification UL V0. The flame retardant is well dispersed; no residues are observed in the mold.

EXAMPLE 21 (COMPARATIVE EXAMPLE)

2 kg of polyamide 11 having a viscosity of $\eta_{rel}=3.2$ is injection molded as described in Example 1 into test specimens having a thickness of 1.6 mm. The white, homogeneous test specimens result in a UL 94 classification of V2. The entire burning time is 21 seconds, the drop number is 43.

EXAMPLE 22

1.8 kg of polyamide 11 having the viscosity indicated in Example 21 is mixed with 0.2 kg of flame retardant mixture according to Example 2 into a dry blend and injection molded as in Example 21 into test rods of a thickness of 1.6 mm. The testing mold shows no residues whatever, the test specimens are homogeneous and correspond to UL classification V0. The entire burning period is 7 seconds, the drop number is 13.

EXAMPLE 23 (COMPARATIVE EXAMPLE)

2 kg of polybutylene terephthalate (PBTP) having a viscosity of $\eta_{rel}=3.3$ is injection molded analogously as described in Example 1. Homogeneous test specimens are the result, having a thickness of 3.2 mm, which cannot be classified under UL 94. The entire burning time is 89 seconds, the drop number is above 120.

EXAMPLE 24

1.6 kg of PBTP corresponding to Example 23 is mixed thoroughly with 0.4 kg of flame retardant batch as described in Example 16 and injection molded as disclosed in Example 23. The injection molded test specimens contain 10 parts by weight of flame retardant mixture VN and 10 parts by weight of polyamide 6. They correspond to UL V0 with a thickness of 3.2 mm. The entire burning time is 16 seconds, the drop number is 18. The rods show homogeneous appearance.

EXAMPLE 25

2.55 kg of polyamide 12 (basic type, unstabilized) is mixed thoroughly with 0.45 kg of flame retardant and injection molded analogously to Example 1. The powdery flame retardant is a thorough mixture of 85 parts of an adduct formed from a mixture of 2 moles of ε-caprolactam with 1 mole of laurolactam together with a mixture of 0.8 mole of hexamethylene diisocyanate with 0.2 mole of 2,4-toluylene diisocyanate. The resultant test specimens correspond, as contrasted to polyamide 12 not provided with flame retardant, to the classification UL V0 with a layer thickness of 1.6 mm.

EXAMPLE 26

2 kg of polyamide 6,6 with a relative viscosity $\eta_{rel}=2.8$, provided with 20 parts by weight of glass microbeads having a maximum grain size of 3,000 μm, is mixed thoroughly with 0.5 kg of flame retardant batch in granular form as described in Example 16, and injection molded into parts having a wall thickness of 5.2 mm. These injection molded parts are subjected to the incandescent wire test DIN VDE 0471, part 2 at 750° C. and 850° C. In both cases, the incandescent wire test is passed.

In order to test resistance against boiling water, the following experiments are carried out:

EXAMPLE 27 (COMPARATIVE EXAMPLE)

1.8 kg of polyamide 6, granulated, is thoroughly mixed with 0.2 kg of finely divided melamine and processed as described in Examples 1 and 4.

The thus-obtained test specimens having a thickness of 1.6 mm are self-extinguishing and correspond to UL 94 V0.

EXAMPLE 28

1.6 kg of polyamide 6,6, granulated, as used in Example 1, is mixed with 0.4 kg of flame retardant batch according to Example 16 and processed into test specimens having a thickness of 1.6 mm. The test specimens are self-extinguishing according to UL 94 V0.

Test rods according to Examples 27 and 28 are dipped for 5 hours into boiling water and, after drying and conditioning, are again subjected to the burning test. The results are set out in Table 5.

It is found that the melamine-treated test specimens no longer correspond to the UL 94 V0 classification. In contrast thereto, the flame retardant effect is preserved in the test specimens treated in accordance with this invention, even under the influence of boiling water.

TABLE 1

PA 6,6 Nonreinforced

| Example | Polymer PA 6,6 | M | VN | MC | UL 94 Classification 1.6 mm | Burning Time for 10 Rods (sec) | Drop Number for 10 Rods | Dispersion | Unmolding | Residues in Mold |
|---|---|---|---|---|---|---|---|---|---|---|
| 1 | 100 | — | — | — | V2 | 8 | 20 |   | + | None |
| 2 | 92 | 7.2 | 0.8 | — | V0 | 0 | 16 | ++ | + | None |
| 3 | 92 | 6.8 | 1.2 | — | V0 | 0 | 19 | ++ | + | None |
| 4 | 92 | 8 | — | — | V0 | 0 | 24 | — | + | Minor |
| 5 | 92 | — | — | 8 | V2 | 5 | 20 | — | + | Minor |

+ = Good
++ = Very Good
− = Bad

TABLE 2

PA 6 Nonreinforced

| Example | Polymer PA 6,6 | M | VN | MC | VH | UL 94 Classification 1.6 mm | Burning Time for 10 Rods (sec) | Drop Number for 10 Rods | Dispersion | Unmolding | Residues in Mold |
|---|---|---|---|---|---|---|---|---|---|---|---|
| 6 | 100 | — | — | — | — | V2 | 9 | 28 |   | + | None |
| 7 | 92 | 6.8 | 1.2 | — | — | V0 | 2 | 15 | + | + | None |
| 8 | 92 | — | — | 8 | — | V2 | 0 | 35 | — | − | None |
| 9 | 92 | 8 | — | — | — | V2 | 4 | 30 | — | + | Minor |
| 10 | 92 | 6 | — | 1.2 | 0.8[1] | V0 | 21 | 7 | — | + | None |

[1] Zinc borate - Calcium stearate Mixture 4:1
+ = Good
− = Bad

TABLE 3

PA 6,6 Glass-Fiber Reinforced

| Example | Polymer[1] PA 6,6 | PA 6 | Glass Fiber | M | VN | MC | UL 94 Classification 3.2 mm | Burning Time for 10 Rods | Drop Number for 10 Rods | Dispersion | Residue in Mold |
|---|---|---|---|---|---|---|---|---|---|---|---|
| 11 | 100 | — | — | — | — | — | n.c. | b.h. | n.c. | — |   |
| 12 | 52.5 | — | 22.5 | 22.5 | 2.5 | — | V0 | 3 | 0 | — | Minor |
| 13 | 52.5 | — | 22.5 | 22.5 | 2.5 | — | V0 | 4 | 0 | + | Minor |
| 14 | 54.25 | — | 23.25 | 22.5 | — | — | V2 | 129 | 5 | − − | Marked |
| 15 | 52.5 | — | 22.5 | — | 2.5 | 22.5 | V2 | 93 | 3 | − − | Marked |
| 16 | 25 | 25 | 25 | 22.5[2] | 2.5[2] | — | V0 | 14 | 0 | + | Very Minor |

[1] Examples 12-15 with PA 6,6/30% by weight glass fiber. Example 16 with PA 6,6/50% by weight glass fiber and flame retardant batch with PA 6 matrix
[2] As flame retardant batch (50% by weight PA 6)
+ = Good
− = Bad
− − = Very Bad
n.c. = Not Classifiable
b.h. = Burns Through to Holder

TABLE 4

Tensile Strength Test According to DIN 53445[1]
Tensile Impact Resistance Test Analogously to DIN 53448[1]
(Cut Notch 6 mm Diameter)

| Example | Polymer | Polymer | M | VN | MC | $\sigma_s$ N/mm² | $a_{ZL}$ kJ/m² |
|---|---|---|---|---|---|---|---|
| 1 | PA 6,6 | 100 | — | — | — | 79.2 | 89.6 |
| 2 | " | 92 | 7.2 | 0.8 | — | 70.0 | 48.8 |
| 5 | " | 92 | — | — | 8 | 57.2 | 35.5 |
| 21 | PA 11 | 100 | — | — | — | 48.6 | 210.6 |
| 22 | " | 90 | 9 | 1 | — | 47.0 | 128.7 |

[1] Measurements on Flat Rod 126 × 12.6 × 1.6 mm

TABLE 5

Resistance to Boiling Water

| | Proportions in % by Weight of Mixture | | | | Without Storage in Boiling Water | | | After Storage for 5 Hours in Boiling Water | | |
|---|---|---|---|---|---|---|---|---|---|---|
| | Polymer | | Flame Retardant | | | | | | | |
| Example | PA 6,6 | PA 6 | M | VN | UL Class. | BD sec | DN | UL Class. | BD sec | DN |
| 27 | 90 | — | 10 | — | V0 | 0 | 28 | V2 | 4 | 22 |

TABLE 5-continued

| | Proportions in % by Weight of Mixture | | | | Resistance to Boiling Water | | | | | |
| --- | --- | --- | --- | --- | --- | --- | --- | --- | --- | --- |
| | | | | | Without Storage in Boiling Water | | | After Storage for 5 Hours in Boiling Water | | |
| | Polymer | | Flame Retardant | | UL | BD | | UL | BD | |
| Example | PA 6,6 | PA 6 | M | VN | Class. | sec | DN | Class. | sec | DN |
| 28 | 80 | 10[1] | 9[1] | 1[1] | V0 | 0 | 17 | V0 | 0 | 14 |

[1]As flame retardant batch (50% by weight PA 6)
BD = Burning duration, in total for 2 × 5 rods
DN = Drop number, in total for 2 × 5 rods

What is claimed is:

1. A self-extinguishing thermoplastic composition comprising a polycondensate selected from the group consisting of thermoplastically processable polyamides, thermoplastically processable polyesters and a mixture thereof and a flame retardant which comprises a mixture of melamine with at least one adduct of ε-caprolactam and hexamethylene diisocyanate in a molar ratio of 0.2 to 0.5 mole of hexamethylene diisocyanate to 1 mole of ε-caprolactam, wherein the proportion of the adduct, based on the mixture of the melamine and adduct, amounts to 5–25% by weight of the flame retardant.

2. The composition according to claim 1, wherein the flame retardant is present in an amount of 2–30% by weight, based on the entire composition.

3. The composition according to claim 1, wherein the polycondensate is polyethylene terephthalate or polybutylene terephthalate.

4. The composition according to claim 1, wherein the polycondensate is polycaprolactam, polyhexamethyleneadipamide, polyaminoundecanoic acid or polylaurolactam.

5. The composition according to claim 1, wherein said composition comprises an auxiliary additive.

6. The composition according to claim 5, wherein the auxiliary additive is a lubricant, filler, reinforcing agent, antioxidant or a mixture thereof.

7. The composition according to claim 1, wherein said composition comprises other flame retardants.

8. A process for the production of the composition according to claim 1, comprising intensively mixing the polycondensate and the flame retardant together in a mixing device.

9. The process according to claim 8, which comprises initially producing a mixture of the polycondensate with a high content of the flame retardant to form a batch and then further admixing polycondensate to said batch.

10. A process for the production of the composition according to claim 1, comprising intensively mixing the polycondensate, the flame retardant and an auxiliary additive together in a mixing device.

* * * * *